United States Patent
Dry et al.

(10) Patent No.: US 10,106,061 B2
(45) Date of Patent: Oct. 23, 2018

(54) AIR-SUSPENDED SEAT SURFACES WITH FLOW CONTROL VALVES

(71) Applicant: Ford Global Technologies, LLC, Dearborn, MI (US)

(72) Inventors: Alan George Dry, Gross Pointe Woods, MI (US); Joseph S. Talamonti, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 367 days.

(21) Appl. No.: 14/825,434

(22) Filed: Aug. 13, 2015

(65) Prior Publication Data
US 2017/0043690 A1 Feb. 16, 2017

(51) Int. Cl.
*B60N 2/66* (2006.01)
*B60N 2/44* (2006.01)
*B60N 2/36* (2006.01)
*B60N 2/90* (2018.01)

(52) U.S. Cl.
CPC ............ *B60N 2/4415* (2013.01); *B60N 2/36* (2013.01); *B60N 2/665* (2015.04); *B60N 2/914* (2018.02); *B60N 2002/363* (2013.01)

(58) Field of Classification Search
CPC ........ B60N 2/4415; B60N 2/665; B60N 2/36; B60N 2/914
USPC .......................................... 297/284.11, 284.6
See application file for complete search history.

(56) References Cited

U.S. PATENT DOCUMENTS

| | | |
|---|---|---|
| 3,730,588 A | 5/1973 | Braun |
| 4,018,477 A | 4/1977 | Hogan |
| 4,316,631 A | 2/1982 | Lenz et al. |
| 4,536,030 A | 8/1985 | Sakurada et al. |
| 4,629,248 A | 12/1986 | Mawbey |
| 4,909,568 A | 3/1990 | Dal Monte |
| 4,965,899 A | 10/1990 | Sekido et al. |
| 5,529,377 A | 6/1996 | Miller |
| 5,584,085 A | 12/1996 | Banko |
| 5,879,053 A | 3/1999 | Lux et al. |
| 6,036,265 A | 3/2000 | Cosentino |
| 6,203,105 B1 * | 3/2001 | Rhodes, Jr. ............ A47C 4/54 297/284.6 X |
| 6,234,578 B1 | 5/2001 | Barton et al. |
| 6,386,633 B1 | 5/2002 | Newton |
| 6,450,579 B1 | 9/2002 | Nylander et al. |
| 6,554,360 B1 | 4/2003 | Wilke et al. |
| 6,623,076 B2 | 9/2003 | Klingler |
| 6,865,825 B2 | 3/2005 | Bailey, Sr. et al. |
| 6,905,170 B2 | 6/2005 | McMillen et al. |
| 6,912,748 B2 | 7/2005 | VanSickle |

(Continued)

FOREIGN PATENT DOCUMENTS

DE 10158876 A1 6/2003
DE 102004017212 B3 6/2005

*Primary Examiner* — Anthony D Barfield
(74) *Attorney, Agent, or Firm* — Vichit Chea; Price Heneveld LLP

(57) ABSTRACT

A vehicle seat includes a cushion having a compressible edge bladder and a compressible inflation bladder positioned aft of the edge bladder. An inflation line fluidically connects the edge bladder and the inflation bladder, and a check valve therein is openable toward the edge bladder under a fluid pressure from the inflation bladder. A deflation line with a dump valve therein further fluidically connects the edge bladder and the inflation bladder.

20 Claims, 6 Drawing Sheets

(56) References Cited

U.S. PATENT DOCUMENTS

| | | |
|---|---|---|
| 7,086,700 B2 | 8/2006 | Habedank |
| 7,108,323 B2 | 9/2006 | Welch et al. |
| 7,225,486 B2 | 6/2007 | Jackson, III |
| 7,255,399 B2 | 8/2007 | White et al. |
| 7,311,358 B2 | 12/2007 | White et al. |
| 7,490,900 B2 | 2/2009 | Szczudrawa |
| 7,874,618 B2 | 1/2011 | Kohl et al. |
| 8,510,884 B2 | 8/2013 | Lee |
| 8,944,504 B2 | 2/2015 | Zimmerman, II |
| 2006/0061183 A1 | 3/2006 | White et al. |
| 2011/0266855 A1 | 11/2011 | Zimmerman, II |

* cited by examiner

AIR-SUSPENDED SEAT SURFACES WITH FLOW CONTROL VALVES

FIELD OF THE INVENTION

The present invention generally relates to a vehicle seat having compressible portions to facilitate folding of the seat. The compressible portions can be inflated into extended positions during use of the seat.

BACKGROUND OF THE INVENTION

Vehicles may include foldable seats in which a seatback thereof can be rotated in a downward direction into contact with a corresponding cushion. Folding seats can be used in connection with, for example, the rear seats of a vehicle such that the seatbacks thereof can be folded, when not occupied by a passenger or the like, to expand the cargo area provided by the trunk of the vehicle. Accordingly, the degree to which the seatback can be folded impacts the useable cargo area achieved by such folding. Due to ergonomic and other concerns, seatbacks and cushions may have contours and thicknesses that limit the folding of the seatback such that a rear surface of the seatback, on which cargo is supported, is angled significantly upward from the adjacent trunk surface. This can impact both the useable cargo space, as well as the ability to reliably place objects on the sloped surface. Accordingly, improvements to vehicle seats are desired that allow for a greater degree of folding.

SUMMARY OF THE INVENTION

According to one aspect of the present invention, a vehicle seat includes a cushion having a compressible edge bladder and a compressible inflation bladder positioned aft of the edge bladder. An inflation line fluidically connects the edge bladder and the inflation bladder, and a check valve therein is openable toward the edge bladder under a fluid pressure from the inflation bladder. A deflation line with a dump valve therein further fluidically connects the edge bladder and the inflation bladder.

According to another aspect of the present invention, a vehicle includes a seat having a cushion with an inflation bladder and an edge bladder beneath a seat surface. The inflation bladder and the edge bladder fluidically coupled by parallel inflation and deflation lines that respectively include therein a check valve and a dump valve. A seatback is coupled with the cushion and is rotatable between open and closed positions. The seatback being further coupled with the dump valve to close the dump valve when in the open position.

According to another aspect of the present invention, a vehicle seat includes a cushion having a compressible edge bladder and a compressible inflation bladder. A first inflation line fluidically connects the edge bladder and the inflation bladder. A first check valve in the inflation line is openable toward the edge bladder under a fluid pressure from the inflation bladder. A first fixed quantity of a flowable medium is contained in a closed system defined by the edge bladder, the inflation bladder, and the first inflation line.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
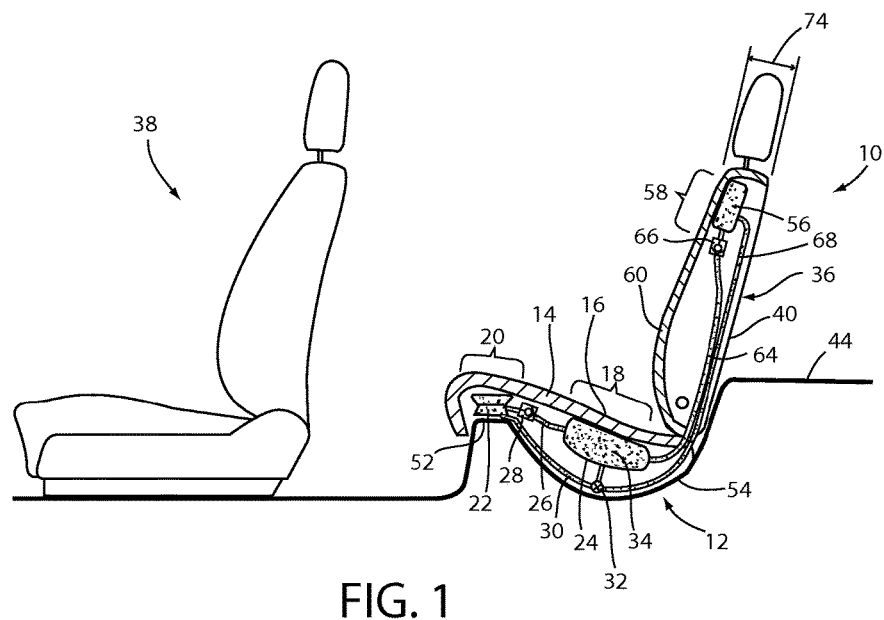
FIG. 1 is a side view of a portion of a vehicle interior including a foldable vehicle seat according to an embodiment of the disclosure.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIG. 1, reference numeral 10 generally designates a vehicle seat. Vehicle seat 10, includes a cushion 12 having a compressible edge bladder 22 and a compressible inflation bladder 24 positioned aft of the edge bladder 22. An inflation line 26 fluidically connects the edge bladder 22 and the inflation bladder 24, and a check valve 28 therein is openable toward the edge bladder 22 under a fluid pressure from the inflation bladder 24. A deflation line 30 with a dump valve 32 therein also fluidically connects the edge bladder 22 and the inflation bladder 24. As further shown in FIG. 1, cushion 12 may further include a cushion coverstock 14 defining a seat surface 16 with a flexible central region 18 and a flexible edge region 20. Edge region 20 of cushion coverstock 14 may overlie bladder 22 may, and inflation bladder 24 may be positioned beneath central region 18 of coverstock 14. A fixed quantity of a flowable medium 34 (such as air or other various inert, non-reactive gasses or mixtures thereof) is contained in and is partially transferable between the edge bladder 22 and the inflation bladder 24.

Figure 2:
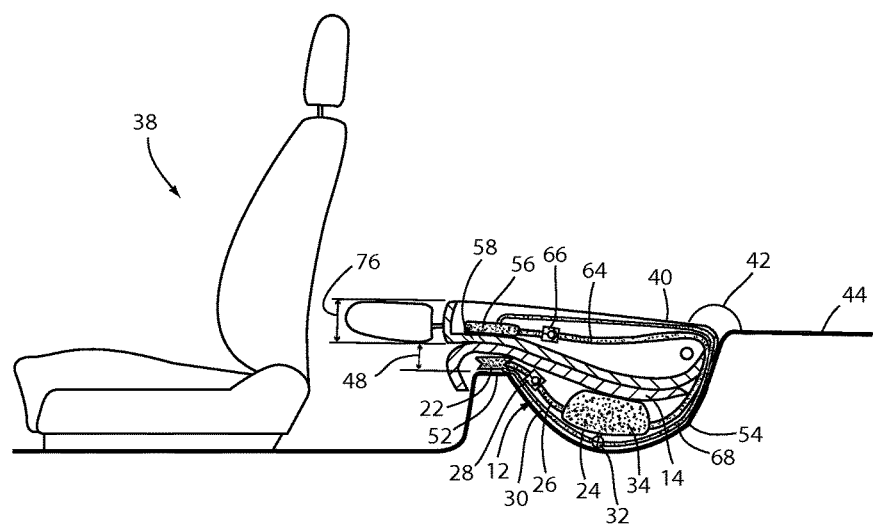
FIG. 2 is a side view of the vehicle interior portion including the foldable vehicle seat of FIG. 1 with the seat in a folded configuration.
Figure 3:
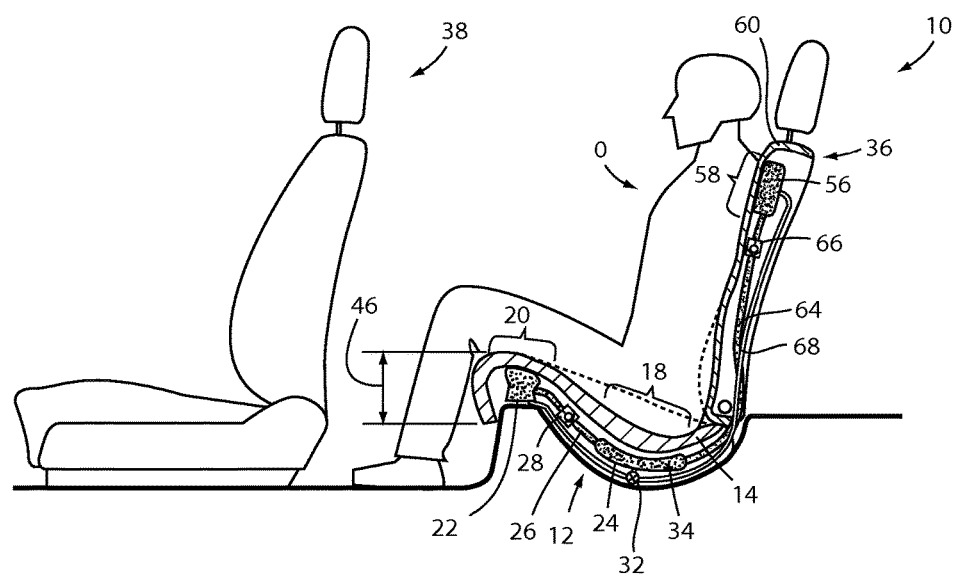
FIG. 3 is a is a side view of the vehicle interior portion including the foldable vehicle seat of FIG. 1 with the seat in an open configuration with an occupant therein.

As shown in FIGS. 1-3, vehicle seat 10 can include a seatback 36 that can be rotatably coupled with cushion 12 such that seatback 36 can be configured in an open position wherein the seatback 36 is away from edge region 20 (as shown in FIG. 1) and a folded, or closed, position (as shown in FIG. 3), wherein a portion of seatback 36 is in contact with edge region 20. In general, the structure of vehicle seat 10 may be similar to that which may be typically found in connection with the rear seats of a vehicle, whereby the folding provided by vehicle seat 10 (as shown in FIG. 2) can be used to increase the cargo capacity of an adjacent trunk of the associated vehicle. Such a folding configuration can also be used in one or more of the front seats 38 of the associated vehicle, such as the passenger-side front seat 38. Accordingly, the various features of vehicle seat 10 discussed herein may be particularly described with reference to a vehicle seat 10 positioned toward the rear of the associated vehicle, and maybe implemented in connection with, for example, a rear, second-row, or third-row bench-style seat (such as a 60/40 split-folding rear bench), rear, second-row, or third-row captain-style seats, or the like. Such features, however, may also be usable in connection with a front passenger seat 38. In an example where seat 10 is a bench seat, the cushion 12 may include separate pairs of fluidically-connected inflation bladders 24, edge bladders 22, inflation lines 26, and deflation lines, respectively underlying the seating surface of the bench seat disposed toward the driver-side and the passenger-side of the vehicle. The inflation lines 26 and the deflation lines 26 can each include a respective check valve 28 and dump valve 32 such that the inflation and deflation of the separated edge bladders 22 is separately enacted.

With continued reference to FIGS. 1-3, the incorporation of the fluidically-connected inflation bladder 24, edge bladder 22, and inflation line 26 can provide for an alteration of the profile of cushion 12 when seat 10 is unoccupied such that an angle 42 of rear seat surface 40 with respect to trunk, or cargo area, floor 44 (which extends rearwardly of seat 10) of about 6°, or less can be achieved. Further, such features may allow cushion 12 to provide a comfortable and safe contour for an occupant O when seated thereon, as shown in FIG. 3. In particular, the various features of cushion 12 provide for such variation in the contour of seat surface 16 by facilitating transfer of flowable medium 34 between inflation bladder 24 and edge bladder 22 under various circumstances. In particular, both edge bladder 22 and inflation bladder 24 can both be generally compressible and/or flexible such that they can be compressed or expanded by variation in pressure on either the interior or the exterior thereof.

Edge bladder 22, inflation bladder 24, inflation line 26, and deflation line 30 can be of generally air-impermeable materials, such as plastic (e.g. polyethylene), rubber, vinyl, or the like such that the edge bladder 22, inflation bladder 24, inflation line 26, and deflation line 30 define a closed unit or system containing a fixed quantity of flowable medium 34 therein. In an example, edge bladder 22 and inflation bladder 24 can be configured to contain the flowable medium 34 at a pressure of up to about 3 pounds per square inch gauge ("p.s.i.g."), but can be inflated with flowable medium 34 to between about one-third and one-half of such maximum pressure, or between about 0.5 p.s.i.g. and 1.0 p.s.i.g. Accordingly, an increase in external pressure over one of either edge bladder 22 or inflation bladder 24 can cause at least a portion of the flowable medium 34 within such structure to transfer and increase the interior pressure of such flowable medium 34 within the other of such structures, given the appropriate positioning of dump valve 32, as discussed further below.

As shown in FIG. 1, vehicle seat 10 may be configurable in an initial, open state, in which seatback 36 is positioned away from at least edge region 20 of cushion 12. Further, the pressure of the flowable medium 34 between edge bladder 22 and inflation bladder 24 may be about equal or somewhat greater within inflation bladder 24 compared to edge bladder 22. In such a configuration, dump valve 32 is in the closed position such that the flowable medium 34 is prevented from passing through deflation line 30, in either direction, between edge bladder 22 and inflation bladder 24. As mentioned previously, check valve 28, which is positioned within inflation line 26 is openable in a direction from inflation bladder 24 to edge bladder 22. In other words, check valve 28 is positioned within inflation line 26 (including, optionally, at the junction thereof with either of inflation bladder 24 or edge bladder 22) and configured such that the flowable medium 34 is permitted to flow out of inflation bladder 24 and through inflation line 26 (including through check valve 28) and into edge bladder 22, but is prevented from flowing out of edge bladder 22, through inflation line 26, and back into inflation bladder 24 (i.e., check valve 28 restricts the flow of the flowable medium 34 to a single direction, toward edge bladder 22, within inflation line 26).

Check valve 28 may be of any known type of check valve useable with the particular flowable medium 34 (e.g., air) in the particular scale of vehicle seat 10 and, more particularly, of edge bladder 22, inflation bladder 24, and inflation line 26. Such check valve types may include, but are not limited to, a ball check valve, a diaphragm check valve, a swing check valve (or tilting disc check valve), a lift-check valve, an in-line check valve, and a duckbill valve. As will be understood, various types of check valves, which open only in one direction, thereby preventing flow in the opposite direction, open under a particular force in the direction of opening. As such, particular check valves, when used in inflation line 26, may allow pressure to accumulate in or be retained within inflation bladder 24 such that the pressure thereof may be somewhat higher than edge bladder 22. Such a condition may further depend on the particular arrangement of dump valve 32, as will be understood upon an explanation on the movement thereof between the aforementioned open and closed positions.

Turning now to FIG. 2, at least a portion of the flowable medium 34 may be transferred from inflation bladder 24 to edge bladder 22 by pressure applied to inflation bladder 24. Due to the arrangement of cushion 12, such pressure may result in compression of inflation bladder 24, from a neutral state (illustrated in FIG. 1), and a corresponding inflation, or at least an increase of the pressure of flowable medium 34 therein, of edge bladder 22 (so long as any external pressure applied to edge bladder 22 is less than the pressure by which inflation bladder 24 is compressed). As shown in FIG. 2, this transfer is carried out when an occupant O is seated on the vehicle seat 10, wherein a majority of the weight of occupant O is centered over central region 18 of seat surface 16 and, accordingly, on inflation bladder 24, which is positioned therebeneath. The weight of occupant O on inflation bladder 24 applies pressure thereon, thereby increasing the pressure on the upstream end of check valve 28, causing check valve 28 to open, thereby allowing a transfer of an amount of the flowable medium 34 to edge bladder 22. This transfer of flowable medium 34 causes edge bladder 22 to inflate or expand under pressure, thereby providing a retention, or supporting, force to support edge region 20 of seat surface 16 above an underlying portion 52, of floor pan 54 in a generally elevated position sufficient to maintain edge region 20 in contact with portions of occupant O thereover (at least when occupant O is in a neutral seated position). The presence of check valve 28 within inflation line 26 and the positioning of dump valve 32 in the closed position will retain edge bladder 22 in such an inflated or expanded position even if occupant O leaves seat 10 or shifts his or her weight temporarily off of the central region 18 of cushion 12 without leaving seat 10.

When seatback 36 is rotated into a folded position, as shown in FIG. 2, the dump valve 32 may move from the closed position (as in FIG. 1) to the opened position (FIG. 2) to allow for movement of flowable medium 34 out of edge bladder 22, through deflation line 30, and into inflation bladder 24. As discussed above, such flow from edge bladder 22 to inflation bladder 24 is prevented from taking place through inflation line 26 by check valve 28. Thusly, edge bladder 22 is maintained in the inflated or expanded condition until dump valve 32 is opened, at which point, the pressure of edge bladder 22 and inflation bladder 24 can equalize under atmospheric pressure, including by transfer of some of the flowable medium 34 from edge bladder 22 to inflation bladder 24 (via dump valve and deflation line 30). Further, pressure of seatback 36 on edge region 20 of coverstock 14 can compress edge bladder 22, thereby transferring a further portion of the flowable medium from edge bladder 22 to inflation bladder 24 (again, via deflation line 30). This, accordingly, moves the edge region 20 of coverstock 14 into a compressed position (FIG. 2), thereby correspondingly increasing the pressure of the flowable medium 34 within inflation bladder 24 and allowing seatback 36 to fold to a generally flatter position (i.e. of a higher angle 42) then would be possible without the compression of edge region 20. In general, coverstock 14 may be comprised of various layers of foam and fabric or leather and may result in a flexible structure such that the various portions thereof are moveable by, for example, a force applied thereto causing compression of the underlying structure (including edge bladder 22 and inflation bladder 24) or by expansion of either of edge bladder 22 or inflation bladder 24.

As shown in FIGS. 1-3, the above-described compression of edge bladder 22 can allow for a change (and/or thickness) of edge bladder 22. As shown in FIG. 1, when edge bladder 22 is in an inflated state, edge bladder 22 may have a height 46 that generally corresponds to the elevated position of edge region 20 of seat surface 16. Upon compression of edge bladder 22, as shown in FIG. 2, edge bladder 22 may have a height 8.0 that is less than height 46 thereof in the inflated state, and which may correspond to the position of edge region 20 of seat surface 16 when in the compressed position (FIG. 2). In an example, edge bladder 22 may be configured such that height 8.0 is less than height 46 by at least about 20 mm, and in one example between about 30 mm and 40 mm, thereby facilitating similar compression of edge region 20 of cushion 12. In an example, height 46 of edge bladder 22 in the compressed position may be about 20 mm. Further, compression of edge bladder 22 may not be evenly-distributed in a direction from the front of cushion 12 to the rear thereof, the compression thereof being measured in such an example by a portion thereof that exhibits the greatest degree of compression.

As can be seen from the above, it may be desired for the positioning of dump valve 32 to be linked with or controlled by the positioning of seatback 36. Such a configuration can allow for dump valve 32 to be appropriately positioned in the closed position when seatback 36 is in the open position such that edge bladder 22 is moved into the inflated or expanded condition when an occupant O sits on seat 10, as discussed above. Further, such a configuration can allow for dump valve 32 to be in the open position when seatback 36 is moved into the closed position (FIG. 3), thereby allowing deflation and/or compression of edge bladder 22 under the weight of or closing force applied to seatback 36 such that seatback 36 can fold downward at a greater angle 42 (i.e. at least about 174° or generally closer to 180°) with respect to trunk floor 44.

In one example, the movement and/or positioning of seatback 36 may be linked with the positioning of dump valve 32 by a linking cable 51 coupled between a portion of the hinge structure 53 that couples seatback 36 with cushion 12 in a rotatable manner and dump valve 32. Such a linking cable 51 can be coupled with hinge structure 53 such that, in an example, cable 51 is extended by the movement of seatback 36 into the closed position. In this manner, dump valve 32 can be biased, either internally or by an associated external structure such as a spring or the like, toward the closed position, with the extension of cable 51 urging dump valve 32 into the open position. In such an example, the length and particular configuration of cable 51 can cause movement of dump valve 32 into the open position once seatback 36 is moved from the open position to a particular, predetermined, angle relative to the closed position (FIG. 3). In such an example, such an "opening angle" can range from about 5° or about 10° from the open position of seatback 36 to within about 5° or about 10° from the closed position of seatback 36. For example, the opening angle can be at an angle 42 of about 135° or about 85° or about 175°, with other angles being possible. In general, it may be desirable for the opening angle to be selected such that dump valve 32 is open before contact of seatback 36 with edge region 20 of cushion 12.

In other examples, the movement and/or positioning of seatback 36 may be linked with the positioning of dump valve 32 by a pair of linking cables that operate to move dump valve 32 from the open position to the closed position and vice-versa at predetermined angles relative to the open position of seatback 36 (i.e. for closing of dump valve 32) and the closed position of seatback 36 (i.e. for opening of dump valve 32). In another embodiment, a button or switch can be positioned within or near cushion 12 that is contacted and actuated by seatback 36 when within a predetermined angle of the closed position, such a button or switch being operatively coupled with dump valve 32 to cause opening thereof when depressed or otherwise actuated. In yet another aspect, the movement of dump valve 32 can be electronically controlled, with a motor or other actuator coupled with dump valve 32 and operable to move dump valve 32 between the open and closed positions thereof. The motor or actuator can be controlled by control circuitry, such as a dedicated chip, processor, or the like (including an application-specific integrated circuit) electrically coupled with a switch or other position sensor configured to relay a signal to the control circuitry when movement from the open position to the closed position (and vice-versa) is desired.

Figure 4:
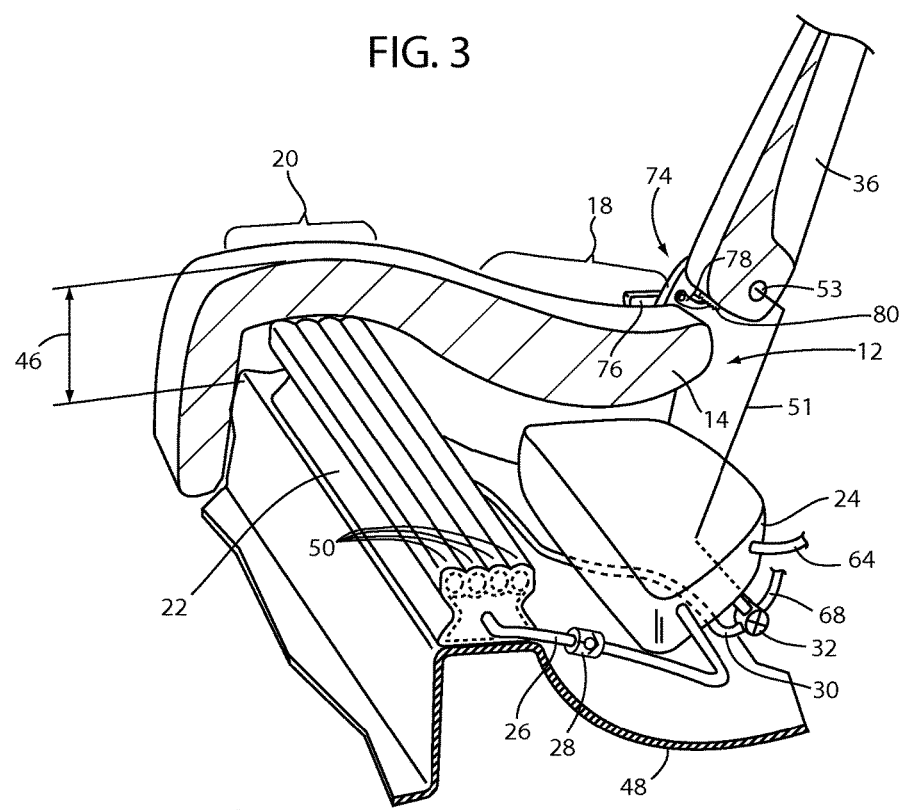
FIG. 4 is a partial cutaway view of a portion of the foldable vehicle seat of FIG. 1.

As further illustrated in FIG. 4, edge bladder 22 may define a plurality of fixed cells 50 which may substitute for all or a portion of any foam which may otherwise be present in coverstock 14 at least in the area of edge bladder 22. As illustrated, such fixed cells 50 do not appreciably expel any air or other medium contained therein during compression of edge bladder 22. Further, cells similar to fixed cells 50 may be present along a portion of inflation bladder 24 and/or along an entirety of seat surface 16 and also within seatback 36.

Returning now to FIGS. 1-3, vehicle seat 10 can include an additional bladder in the form of an upper bladder 56 within a flexible upper region 62 of seatback 36. As illustrated, in an embodiment upper bladder 56 can be connected with inflation bladder 24 by a seatback inflation line 64, having a seatback check valve 66 therein, and a parallel seatback deflation line 68 that is also fluidically connected with dump valve 32 and, thusly, with inflation bladder 24. In this manner, seatback inflation line 64 and upper bladder 56 can be included in the closed unit described above as including edge bladder 22, inflation bladder 24, inflation line 26 and deflation line 30. As such, upper bladder 56 can be of the same or similar material to edge bladder 22 and inflation bladder 24 so as to be generally compressible by resilient deformation thereof under pressure and may further be generally air impermeable such that the fixed quantity of flowable medium 34 can further be contained in upper bladder 56 and transferable at least in part, from inflation bladder 24 to upper bladder 56 via seatback inflation line 64, including through seatback check valve 66, which serves to retain the portion of the flowable medium 34 in upper bladder 56 when dump valve 32 is in the closed position, such as when seatback 36 is in the open position. Additionally, when dump valve 32 is in the open position, the portion of the flowable medium 34 within upper bladder 56 is transferable (at least in part) back to inflation bladder 24 via seatback deflation line 68, including through dump valve 32.

In a manner similar to edge bladder 22, described above, upper bladder 56 can support a portion of seatback coverstock 60 within upper region 58 thereof when upper bladder 56 is in an inflated or expanded state, which may be achieved due to pressure on inflation bladder 24, such as by the weight of occupant O, as shown in FIG. 3, moving a portion of the flowable medium 34 from inflation bladder 24 to upper bladder 56 (in addition to edge bladder 22), where it is retained therein by seatback check valve 66 and the closed dump valve 32. Further, a portion of flowable medium 34 can be expelled from upper bladder 56 and into inflation bladder 24 due to pressure applied to upper region 58 when dump valve 32 is in the open position, such as by forceable movement of seatback 36 into the folded position shown in FIG. 2. Such compression can allow for a decrease in thickness 74 of seatback 36 adjacent upper region 58 by movement of seatback coverstock 60 within upper region 58 between an extended position and an inward position wherein a thickness of seatback 36 is greater when coverstock 60 is in the extended position (thickness 74 in FIG. 1) within upper region 58 than when in the compressed position (thickness 76 in FIG. 2). Such compressibility may further add to the ability of vehicle seat 10 to fold into a relatively flatter position. In such an embodiment, inflation bladder 24 can be sized to receive portions of flowable medium 34 from both upper bladder 56 and edge bladder 22 when both are in the compressed state. In a further embodiment, cushion 12 can include multiple inflation bladders 24, such as one or more, each, associated the upper bladder 56 and the edge bladder 22, respectively, as described in the co-pending, commonly-assigned U.S. patent application Ser. No. 14/623,957 filed on Feb. 17, 2015 and entitled "AIR-SUSPENDED SEAT SURFACES FOR FOLDING VEHICLE SEATS," and Ser. No. 14/623,970 filed on Feb. 17, 2015 and entitled "AIR-SUSPENDED SEAT SURFACES FOR FOLDING VEHICLE SEATS," the entire disclosures of which are hereby incorporated by reference herein. In such an embodiment, a separate dump valve 32 may be associated with each of the inflation bladders.

The above-described vehicle seat 10 can allow for operation thereof between the open position shown in FIG. 1, particularly for use by an occupant O, as shown in FIG. 3, and the closed position shown in FIG. 2. More particularly, seat 10 can provide for comfortable support for occupant O on seat surface 16 with support both in central region 18 and edge region 20, when seat 10 is in the open position. Seat 10 can also provide a generally compact (or low-angle) closed position in which cushion 12 and, optionally, seatback 36 are compressed in the respective edge region 20 and upper region 58 during folding. The disclosed incorporation of dump valve 32 and check valves 28 and 66 can allow for cyclical use between these positions by the above-described automatic positioning of dump valve 32 in the closed position when seatback 36 is in the open position (FIGS. 1 and 2) such that compression of inflation bladder 24 transfers a portion of the flowable medium 34 into edge bladder 22 (and, optionally, another portion of the flowable medium 34 into upper bladder 56), which is retained therein by check valve 28 (and, optionally, check valve 66) until movement of seatback 36 out of the open position, and/or toward the closed position, causes opening of dump valve 32, at which point edge bladder 22 and, optionally, upper bladder 56 can be compressed to, again, allow positioning of seatback 36 in the closed position illustrated in FIG. 3. As shown in FIG. 4, a latch 74 can be incorporated into seat 10 and can include a lever 76 with a pawl 78 coupled thereto that can interact with a ratchet 80 on seatback 30 such that seatback 30 can be retracted in a down and "locked" condition to retain the low seatback angle against any remaining expansive forces.

Figure 5:
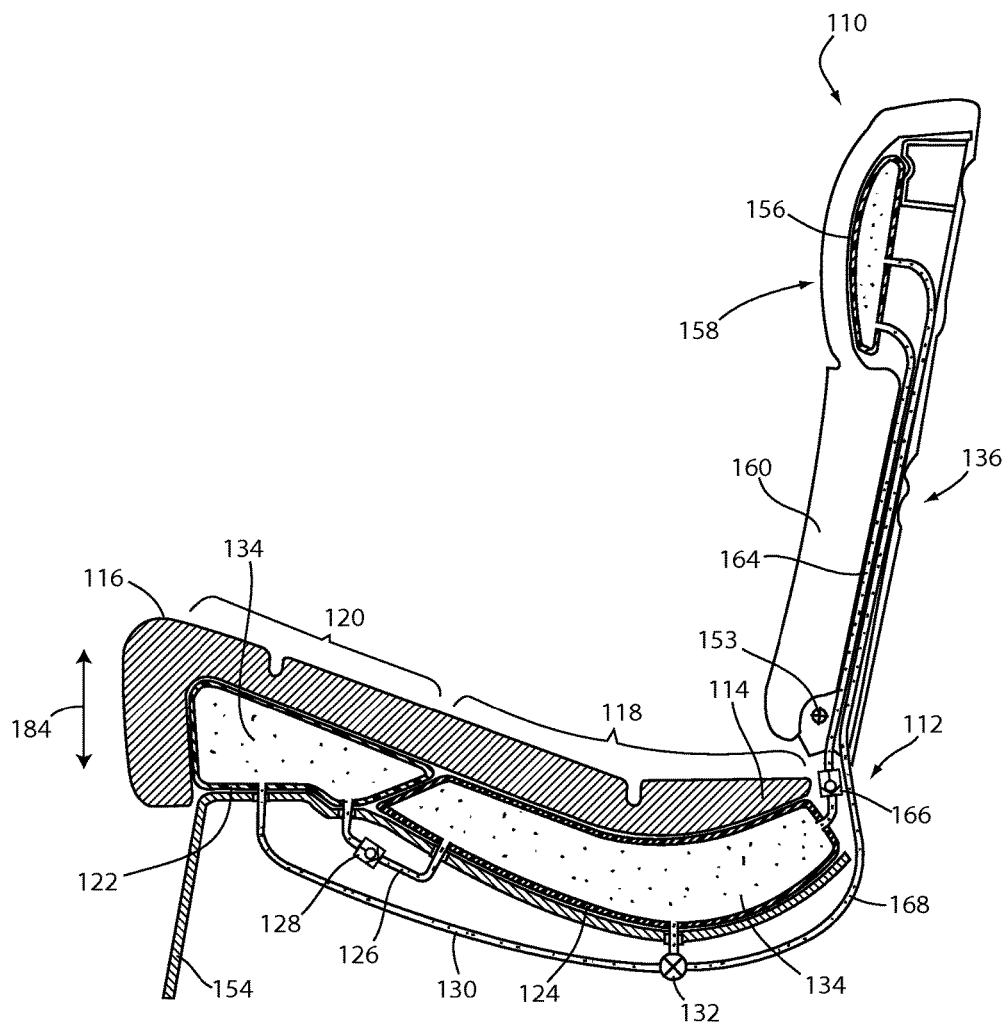
FIG. 5 is a side, cross section view of a foldable vehicle seat according to an alternative embodiment of the disclosure in an open, unoccupied state.
Figure 6:
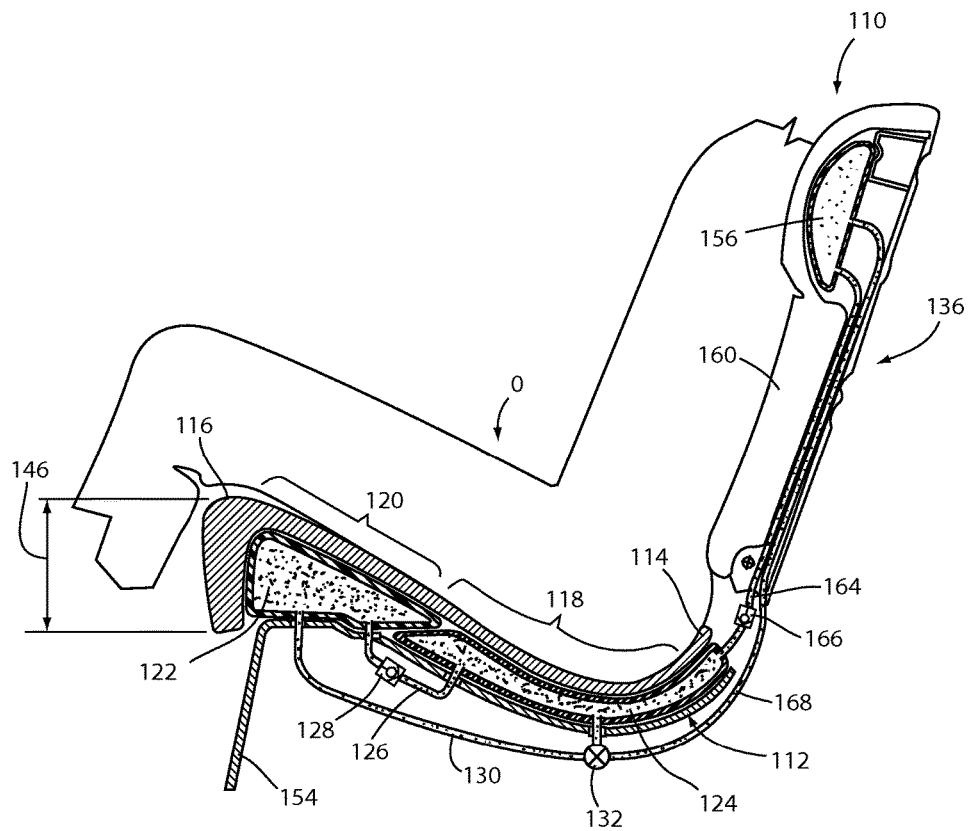
FIG. 6 is a side, cross section view of the foldable vehicle seat portion of FIG. 5 in an open, occupied state.
Figure 7:
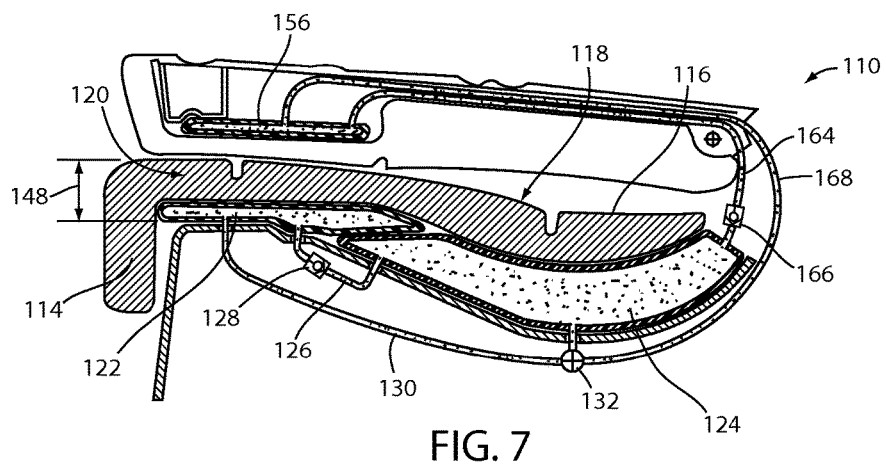
FIG. 7 is a side, cross section view of the foldable vehicle seat portion of FIG. 5, the vehicle seat shown in a folded state.

As shown in FIGS. 5-7, in a variation of vehicle seat 110, edge bladder 122 and inflation bladder 124 can be configured to extend substantially throughout the entirety of seat surface 116, including in a fore-aft direction within the associated vehicle. In such a configuration, edge bladder 122 can be configured to partially overlap with inflation bladder 124 in a vertical direction 184. The extension of edge bladder 122 and inflation bladder 124 throughout the entirety of seat surface 116 may help to provide reliable compression of inflation bladder 124 by an occupant O seated in vehicle seat 110, including by accommodating for various seating positions of occupant O with respect to vehicle seat 110. Further, the overlap between edge bladder 122 and inflation bladder 124 may help provide a generally smooth transition between such components when an occupant O is seated in vehicle seat 110, as shown in FIG. 15.

As shown in FIG. 5, vehicle seat 110 may function in a similar manner to other embodiments of vehicle seats discussed herein, including by transferring a portion of flowable medium 134 from inflation bladder 124 to edge bladder 122 under pressure on inflation bladder 124 by the weight of an occupant O thereon. Again, such a transfer of flowable medium 134 to edge bladder 122 may provide an expansion force within edge bladder 122 sufficient to urge edge region 120 into the extended position and/or to maintain edge region 120 in such a position under the weight of the legs, for example, of occupant O thereon. As discussed above, the presence of check valve 128 in inflation line 126 and the closed positioning of the dump valve 132 within deflation line 130 serves to maintain edge bladder 122 in such an inflated state when seat 110 is in the open position. Seat 110 can also operate similarly with respect to the inflation or expansion of upper bladder 156 and retention thereof in the expanded condition by seatback check valve 166 in combination with dump valve 132. Further, seat 110 allows for deflation of edge bladder 122 under pressure from a downwardly-folded seatback 136 against edge region 120 of cushion 112, including transfer of a portion of the flowable medium 134 from edge bladder 122 to inflation bladder 124 through the open dump valve 132, which may be similarly linked with the positioning or movement of seatback 136.

Figure 8:
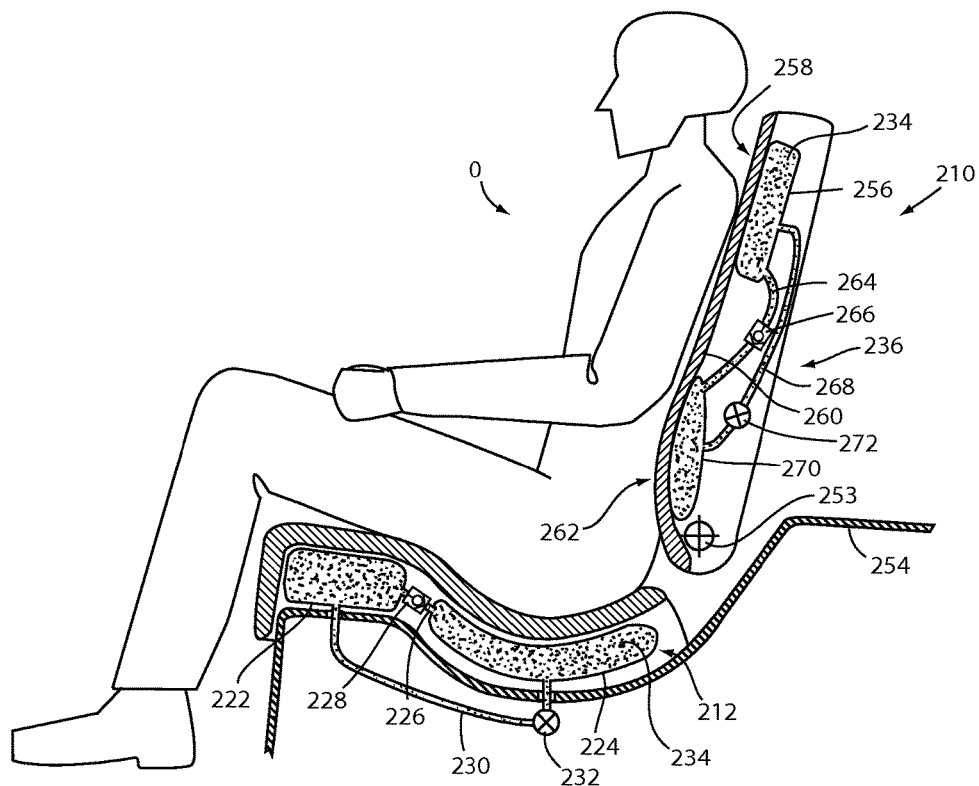
FIG. 8 is a side, cross section view of a foldable vehicle seat according to a still further embodiment of the disclosure, the vehicle seat shown in an open, occupied state.
Figure 9:
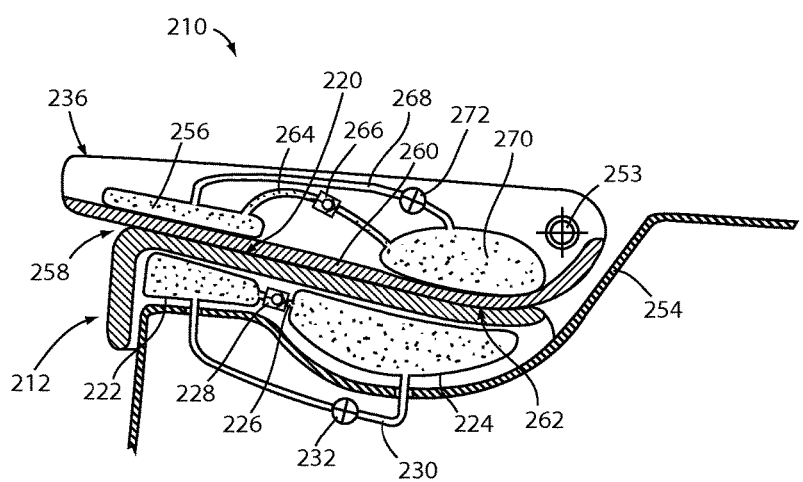
FIG. 9 is a side, cross section view of the foldable vehicle seat portion of FIG. 8 in a folded state.

Turning now to FIGS. 8 and 9, a further variation of vehicle seat 210 is shown, in which seatback 236 includes an upper bladder 256 positioned beneath an upper region 258 of seatback coverstock 260. Upper bladder 256 is of a similar construction to, for example, upper bladder 156 described above with respect to FIGS. 1-3 and is further compressible by expulsion of a portion of a flowable medium 234 contained therein under a pressure applied thereto and inflatable by transfer of a further portion of the flowable medium 234 thereinto. As illustrated, seatback 236 further includes a seatback inflation bladder 270 positioned therein and underlying a lower region 262 of seatback coverstock 260 that corresponds, for example, to the general area of seatback 236 that provides lumbar support for an occupant. Accordingly, a second fixed quantity of flowable medium 234 is contained within the second closed unit formed by seatback inflation bladder 270, upper bladder 256, seatback inflation line 226, and seatback deflation line 268, with seatback inflation line 226 and seatback deflation line 268 fluidically connecting upper bladder 256 with seatback inflation bladder 270. As also shown in FIG. 8, a seatback dump valve 272 is positioned within seatback deflation line 268 and can also be linked such that the movement thereof from the open position to the closed position corresponds to movement of the seatback 236 from the closed position to the open position (and vice-versa), in a similar manner to that which is discussed above.

As shown in FIG. 8, seatback inflation bladder 270 is compressible under the weight of a portion of occupant O (e.g. the lower back region) when seated in vehicle seat 210. Such compression of seatback inflation bladder 270 causes a portion of the fixed quantity of the flowable medium 234 through seatback inflation line 264, including seatback check valve 266, and into upper bladder 256, thereby increasing the pressure of the flowable medium 234 within upper bladder 256 and providing a corresponding force therein to retain the upper region 258 in an extended position (as shown in FIG. 8) to maintain upper region 258 of seatback coverstock 260 in general contact with an adjacent portion of occupant O. The pressure of the flowable medium 234 within seatback inflation bladder 270, upper bladder 256, seatback inflation line 264, and seatback deflation line 268 can be in the same general range of pressure for flowable medium 34 described above with respect to FIGS. 1-3.

As shown in FIG. 9, when seatback dump valve 272 is in the open position, upper bladder 256 is compressible so as to permit movement of the upper region 258 of seatback coverstock 260 to be moved into the corresponding compressed position, such as under forcible movement of seatback 236 into the folded position shown in FIG. 9 (which can also cause opening of seatback dump valve 272), wherein edge region 220 of cushion 212 is pressed into upper region 258 of seatback coverstock 260. Such compression of upper region 258 and of upper bladder 256 can be generally similar to the compression thereof described above with respect to FIGS. 1-3.

Figure 10:
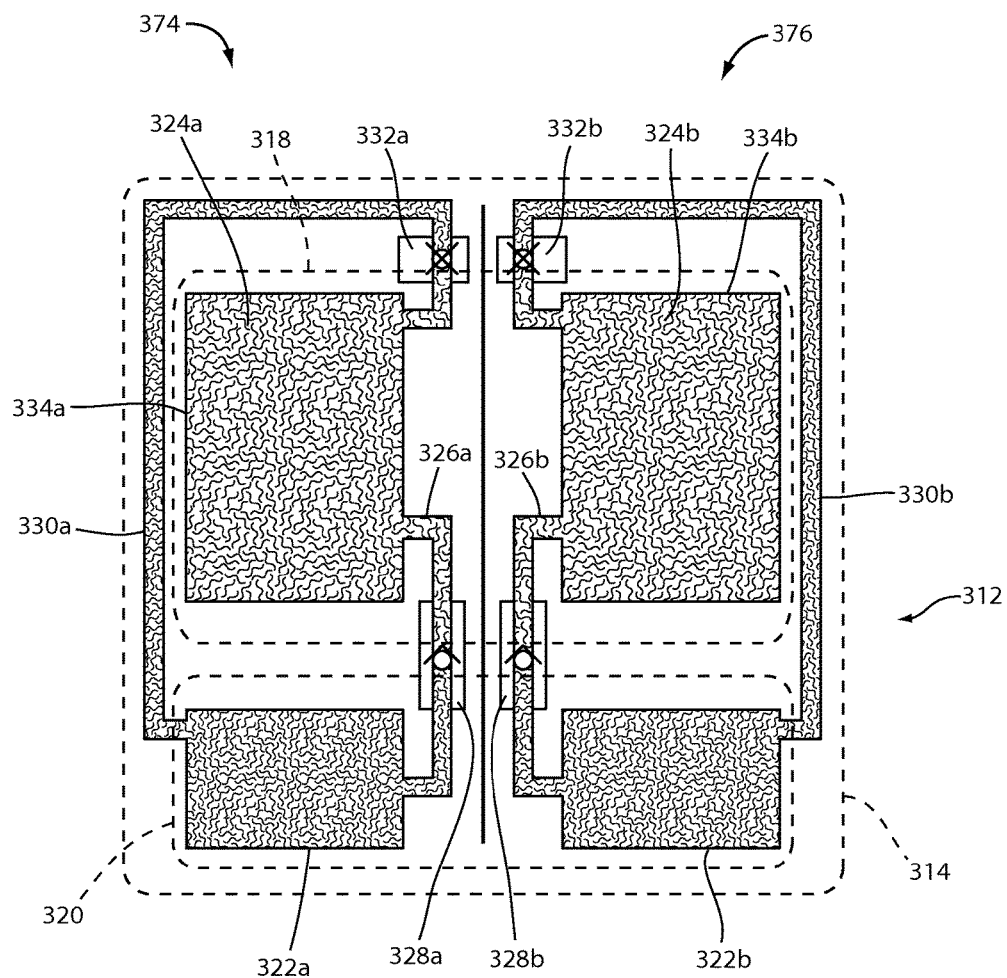
FIG. 10 is a top view of an inflation system useable in a seat cushion.

Turning now to FIG. 10, a variation of a cushion 312 useable in any of the above-described vehicle seats (10, 110, 210) described herein is shown. The illustrated cushion includes separate sets of edge bladders 322a, 322b, inflation bladders 324a, 324b, inflation lines 326a, 326b, and deflation lines 330a, 330b, each coupled together in separate closed systems containing respective first and second flowable media 334a, 334b and positioned beneath respective first and second lateral sides 374, 376 of cushion 312. Further, each separate inflation line 326a and 326b includes its own respective check valve 328a and 328b to allow transfer of portions of the respective flowable media 334a, 334b from the inflation bladders 324a and 324b into the respective edge bladders 322a and 322b and restrict flow in the opposite direction. Similarly, each respective deflation line 330 can include its own respective dump valve 332a, 332b to selectively restrict flow of the respective flowable media 334a, 334b therethrough. As discussed above, the dump valves 332a and 332b can be respectively coupled with a seatback associated with cushion 312 to cause dump valves 332a and 332b to open when the seatback is moved into a folded position. The depicted arrangement can help to provide proper inflation of edge bladders 322a and 322b and, accordingly, appropriate raising of edge region 220 under uneven loading of central region 318, which can be due to an occupant of seat 310 being seated on cushion 312 in an offset or uneven manner, by forcing the flowable medium 334a or 334b into the associated edge bladder 322a or 322b instead or redistributing a single flowable medium within a single, larger inflation bladder.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A vehicle seat, comprising:
a cushion including:
a compressible edge bladder;
a compressible inflation bladder positioned aft of the edge bladder;
an inflation line fluidically connecting the edge bladder and the inflation bladder, a check valve therein openable toward the edge bladder under a fluid pressure from the inflation bladder; and
a deflation line with a dump valve therein further fluidically connecting the edge bladder and the inflation bladder.

2. The vehicle seat of claim 1, further comprising a coverstock defining a seat surface with a flexible central region and a flexible edge region, the flexible central region overlying the inflation bladder and the flexible edge region overlying the edge bladder.

3. The vehicle seat of claim 1, further comprising a first fixed quantity of a flowable medium contained in a closed system defined by the edge bladder, the inflation bladder, the inflation line and the deflation line, wherein:
the check valve in the inflation line restricts movement of a portion of the flowable medium to a first direction from the inflation bladder to the edge bladder; and
the dump valve in the deflation line is moveable between a closed position, in which movement of the flowable medium between the edge bladder and the inflation bladder is prevented, and an open position, in which movement of the flowable medium between the edge bladder and the inflation bladder is allowed.

4. The vehicle seat of claim 3, further including a seatback rotatably coupled with the cushion, wherein:
the seatback is moveable by the rotatable coupling thereof with the cushion between an open position and a closed position;
the seatback is coupled with the dump valve such that, when the seat is in the open position, the dump valve is in the closed position and, when the seat is within a range from the closed position to a predetermined angle from the open position, the dump valve is in the open position.

5. The vehicle seat of claim 4, further including a coverstock defining a cushion edge region overlying the edge bladder and a seatback upper region, wherein:
the upper region of the seatback is positioned away from the edge region of the cushion when the seatback is in the open position, and the seatback upper region is in contact with the cushion edge region when the seatback is in the closed position; and
when the seatback is in the closed position, the contact between the cushion edge region and the seatback upper region compresses the edge bladder, thereby transferring a second portion of the first fixed quantity of the flowable medium from the edge bladder, through the dump valve in the open position, to the inflation bladder.

6. The vehicle seat of claim 5, further including:
a compressible upper bladder underlying the seatback upper region;
a seatback inflation line fluidically connecting the upper bladder and the inflation bladder, a seatback check valve therein openable toward the upper bladder under a fluid pressure from the inflation bladder; and
a seatback deflation line fluidically connecting the upper bladder to the dump valve.

7. The vehicle seat of claim 6, wherein:
the first fixed quantity of the flowable medium is further contained within the upper bladder and is further partially transferable between the inflation bladder and the upper bladder; and
when the seatback is in the closed position, the contact between the cushion edge region and the seatback upper region further compresses the upper bladder, thereby transferring a third portion of the first fixed quantity of the flowable medium from the upper bladder, through the dump valve in the open position, to the inflation bladder.

8. The vehicle seat of claim 1, further comprising a seatback rotatably coupled with the cushion, defining a flexible upper region and a flexible lower region, and including:
a compressible upper bladder underlying the upper region;
a compressible seatback inflation bladder underlying the lower region;
an inflation line fluidically connecting the upper bladder and the seatback inflation bladder, a check valve therein openable toward the upper bladder under a fluid pressure from the seatback inflation bladder; and
a seatback deflation line with a dump valve fluidically connecting the edge bladder and the inflation bladder.

9. The vehicle seat of claim 8, wherein:
the seatback is moveable by the rotatable coupling thereof with the cushion between an open position and a closed position;
the seatback is coupled with the cushion dump valve and the seatback dump valve such that, when the seat is in the open position, the cushion dump valve and the seatback dump valve are in the respective closed positions and, when the seat is within a range from the closed position to a predetermined angle from the open position, the cushion dump valve and the seatback dump valve are in the respective open positions.

10. A vehicle, comprising:
a seat, including:
a cushion including an inflation bladder and an edge bladder beneath a seat surface, the inflation bladder and the edge bladder fluidically coupled by parallel inflation and deflation lines, respectively including therein a check valve and a dump valve; and
a seatback coupled with the cushion and rotatable between open and closed positions and coupled with the dump valve to close the dump valve when in the open position.

11. The vehicle of claim 10, wherein the seatback is further coupled with the dump valve such that, when the seat is within a range from the closed position to a predetermined angle from the open position, the dump valve is in the open position.

12. The vehicle of claim 10, wherein the seat further includes a first fixed quantity of a flowable medium contained in a closed system defined by the edge bladder, the inflation bladder, the inflation line and the deflation line, wherein:
the check valve in the inflation line restricts movement of the flowable medium to within a first direction from the inflation bladder to the edge bladder; and
the dump valve in the deflation line prevents movement of the flowable medium between the edge bladder and the inflation bladder when in the closed position and allows movement of the flowable medium between the edge bladder and the inflation bladder when in the open position.

13. The vehicle of claim 10, wherein:
the cushion of the seat defines a cushion edge region overlying the edge bladder;
the seatback of the seat defines a seatback upper region;
the seatback upper region is positioned away from the cushion edge region when the seatback is in the open position and the seatback upper region is in contact with the cushion edge region when the seatback is in the closed position; and
when the seatback is in the closed position, the contact between the cushion edge region and the seatback upper region compresses the edge bladder, thereby transferring a portion of the first fixed quantity of the flowable medium from the edge bladder, through the dump valve in the open position, to the inflation bladder.

14. The vehicle of claim 10, further including:
a cargo area floor extending rearwardly from the seat; and
a ratchet latch operably coupled between the cushion and the seatback;
wherein, when in the closed position, the ratchet latch is in an engaged configuration in which a retention force is applied between the cushion and the seatback to retain the seatback in the closed configuration such that a rear surface of the seatback is positioned adjacent the cargo area floor and is angled with respect thereto at an angle of at most 6 degrees.

15. A vehicle seat, comprising:
a cushion defining an edge region and including:
a compressible edge bladder underlying the edge region such that the edge region of the cushion is expandable from a compressed position to an elevated position;
a compressible inflation bladder;
a first inflation line fluidically connecting the edge bladder and the inflation bladder, a first check valve therein openable toward the edge bladder under a fluid pressure from the inflation bladder; and
a first fixed quantity of a flowable medium contained in a closed system defined by the edge bladder, the inflation bladder, and the first inflation line;
wherein the inflation bladder is compressible from a neutral state to a compressed state causing at least partial transfer of the fixed quantity of the flowable medium from the inflation bladder to the edge bladder.

16. The vehicle seat of claim 15, further including:
a seatback coupled with the cushion and including a compressible upper bladder; and
a second inflation line fluidically connecting the upper bladder and the inflation bladder, a second check valve therein openable toward the upper bladder under the fluid pressure from the inflation bladder.

17. The vehicle seat of claim 16, further comprising a deflation line with a dump valve fluidically connecting the edge bladder and the upper bladder with the inflation bladder such that the first and second deflation lines further defines the closed system, wherein:
the dump valve is moveable between a closed position, in which movement of the flowable medium from the edge bladder and the upper bladder to the inflation bladder is prevented, and an open position, in which movement of the flowable medium the edge bladder and the upper bladder to the inflation bladder is allowed.

18. The vehicle seat of claim 15, further comprising a deflation line with a dump valve fluidically connecting the edge bladder with the inflation bladder such that the deflation line further defines the closed system, wherein:
the dump valve is moveable between a closed position, in which movement of the flowable medium from the edge bladder to the inflation bladder is prevented, and an open position, in which movement of the flowable medium the edge bladder to the inflation bladder is allowed.

19. The vehicle seat of claim 18, further comprising a seatback rotatably coupled with the cushion such that the seatback is moveable by the rotatable coupling thereof with the cushion between an open position and a closed position; wherein
the seatback is coupled with the dump valve such that, when the seat is in the open position, the dump valve is in the closed position and, when the seat is within a range from the closed position to a predetermined angle from the open position, the dump valve is in the open position.

20. The vehicle seat of claim 15, wherein the edge bladder is a first edge bladder and the inflation bladder is a first inflation bladder, the cushion defines first and second lateral seating areas spaced apart from each other, and the first edge bladder and the first inflation bladder underlie the first lateral seating area, the vehicle seat further including:
a second edge bladder underlying the second lateral seating area;
a second inflation bladder underlying the second lateral seating area;
a second inflation line fluidically connecting the second edge bladder and the second inflation bladder, a second check valve therein openable toward the second edge bladder under a fluid pressure from the second inflation bladder; and
a second fixed quantity of a flowable medium contained in the second edge bladder, the second inflation bladder, and the second inflation line.

* * * * *